J. H. MACKALL.
AIR TIGHT SHIPPING CONTAINER.
APPLICATION FILED MAY 8, 1915.
1,180,168.
Patented Apr. 18, 1916.
2 SHEETS—SHEET 1.
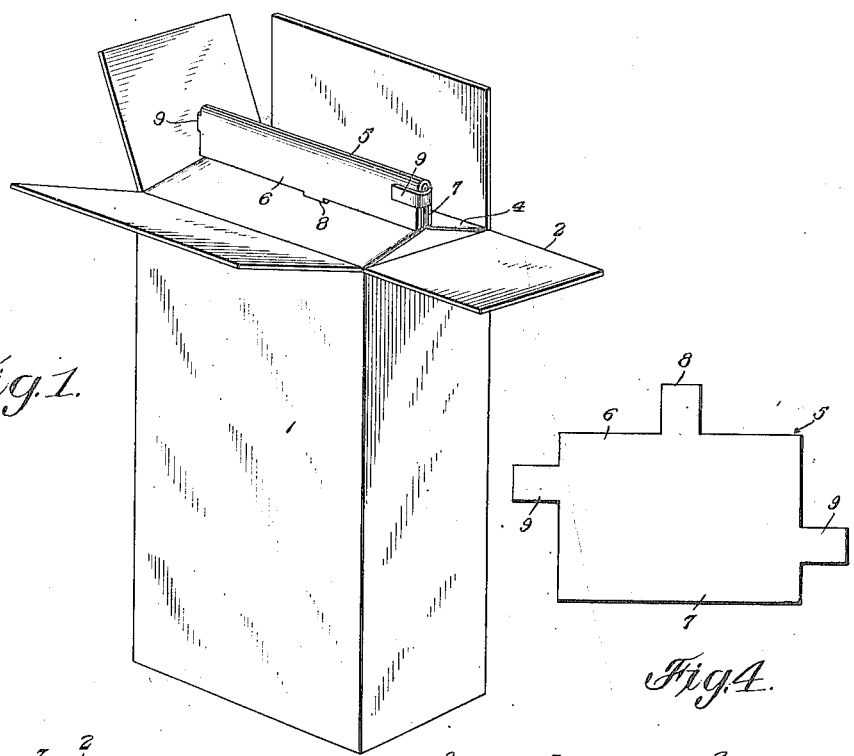
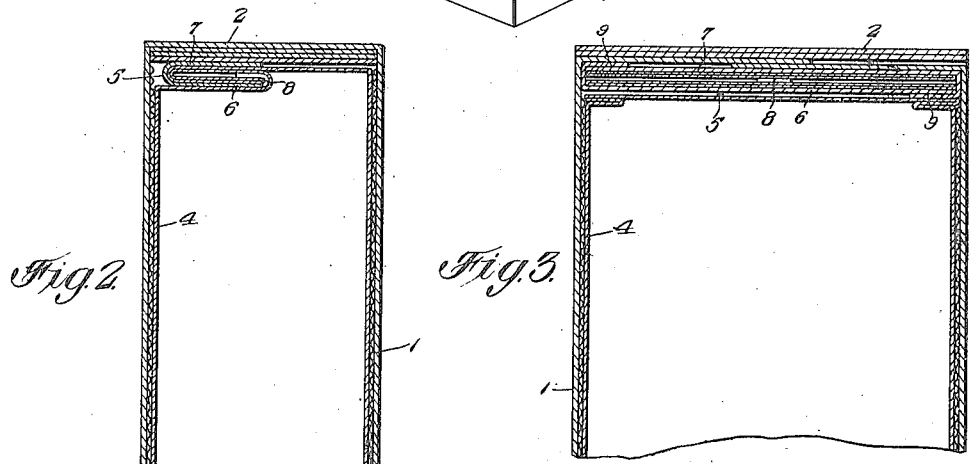
Witnesses
J. H. Crawford
Edward Geager
Inventor
J. H. Mackall,
By Victor J. Evans
Attorney

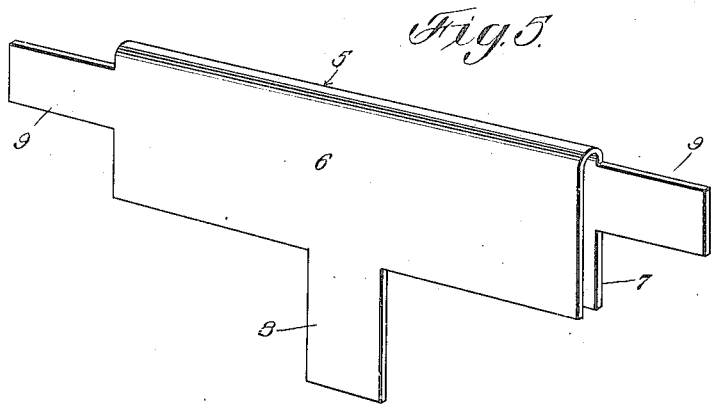
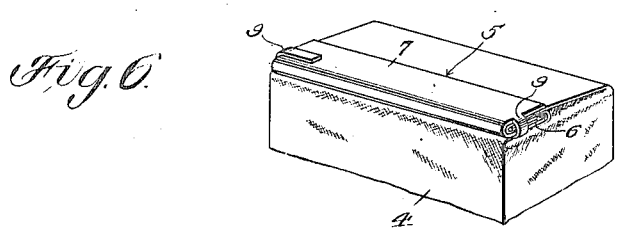
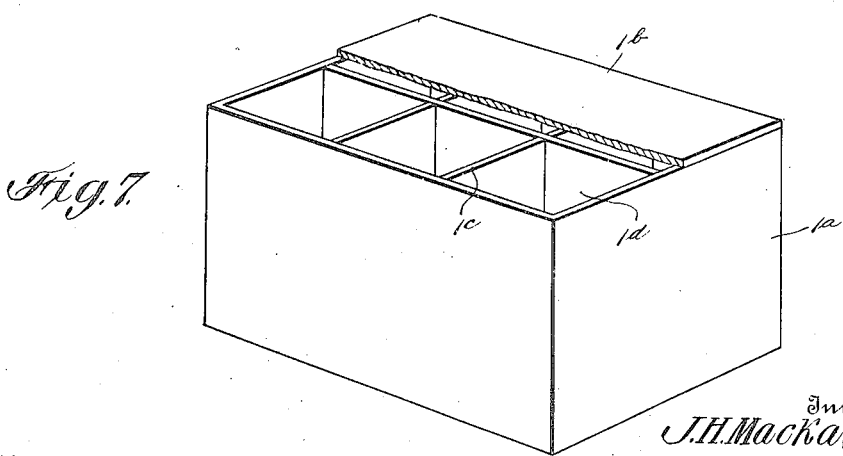

UNITED STATES PATENT OFFICE.

JAMES H. MACKALL, OF CLEVELAND, OHIO.

AIR-TIGHT SHIPPING-CONTAINER.

1,180,168.

Specification of Letters Patent. Patented Apr. 18, 1916.

Application filed May 3, 1915. Serial No. 26,819.

*To all whom it may concern:*

Be it known that I, JAMES H. MACKALL, a citizen of the United States, residing at Cleveland, in the county of Cuyahoga and State of Ohio, have invented new and useful Improvements in Air-Tight Shipping-Containers, of which the following is a specification.

This invention is an improved container especially adapted for shipping candy and protecting the candy from the atmosphere and from becoming damp in wet weather or dry and hard in dry weather, the object of the invention being to provide an improved container of this class which is extremely cheap and simple, is strong and durable, and by means of which candy and other like material effectually preserved from exposure to the atmosphere while being shipped or stored.

The invention consists in the construction, combination and arrangement of devices hereinafter described and claimed.

In the accompanying drawings:—Figure 1 is a perspective view of a container constructed in accordance with my invention, showing the top of the outer container open and showing the inner container in the act of being rolled and folded. Fig. 2 is a sectional view of the same showing the inner container in the outer container and both closed. Fig. 3 is a detail sectional view on a plane at right angles to that of Fig. 2. Fig. 4 is a detail plan, showing the clamp when in initial, flattened out condition, before being bent for application to the inner container. Fig. 5 is a detail perspective view of the clamp, when bent and arranged for use. Fig. 6 is a detail perspective view showing the inner container in fully closed condition and as arranged in the outer container so that the latter can be closed. Fig. 7 is a perspective view showing a modified construction of the outer container and in which the outer container forms a series of compartments each of which is adapted to receive and store one of the inner containers when filled.

In accordance with my invention I provide an outer container 1 which is preferably made of corrugated board of double thickness and extra strength. The outer container is of oblong rectangular form and its top and bottom are formed by flaps 2, 3 which are adapted to be arranged in folded relation and pasted or otherwise secured, to close the outer container. I also provide an inner container 4 which is made of air tight material and is in the form of a bag and is usually constructed of waxed paper. The inner container is adapted to snugly fit in the outer container and is longer than the outer container so that when the inner container is in the outer container and before it is closed, its upper end extends upwardly above the open upper end of the outer container. When the inner and outer containers have been thus arranged the candy or other material is placed in the inner container in sufficient quantity to fill the outer container and the upper end of the inner container is then closed and folded to adapt the inner container to be entirely disposed within the outer container, exclude air from the inner container and enable the top flaps of the outer container to be secured.

To fold and secure the upper end of the inner container I provide a clamp 5 which is made of sheet metal, usually tin and the length of which is about equal to the width of the inner container. This clamp is U-shaped cross sectionally and thereby provided with sides 6, 7 to receive the doubled and closed upper end of the inner container between them. The side 6 is provided with a bendable lip 8 to be doubled around the upper edges of the inner container and to bind and close said edges between the sides of the clamp. The sides of the clamp are provided also with bendable lips 9 which are reversely arranged, each of the said sides being provided with said bendable lips, and said lips being at opposite sides of the clamp. These lips are for securing the sides of the clamp together and clamping the folded or rolled down portion of the inner container between them. It will be observed that when the clamp is thus attached to the inner container and the latter rolled at its upper end the mouth of the inner container is effectually closed so as to exclude air and moisture and the clamp is arranged just below the top of the outer container.

In Fig. 7 of the drawings I show a modified construction of the outer container at $1^a$ and in which the outer container is a box, open on one side and adapted to be closed by a cover $1^b$, nailed or otherwise secured to the outer container. This form of outer container is provided with partitions $1^c$ which form a series of compartments $1^d$, each open at one end, and at the open flat side of the outer container 1ª and of a size and shape adapted to receive one of the inner containers, when the latter is filled.

By thus providing an outer container which is adapted to hold a number of inner containers, an assortment of goods may be readily packed in a single outer container with each kind of goods in a separate inner container and thus greatly facilitate the packing and transportation of goods and making especially practicable to supply small stores with an assortment of items in small quantities, pure, sanitary and always fresh.

Having thus described my invention I claim:—

A clamp for closing and rolling the mouth of a bag or the like, comprising a blank of material adapted to be bent into a U-form for the reception of the mouth of the bag, a centrally disposed tongue projecting from the longer edge of one of the parallel members of said U and adapted to be bent into parallel relation with said member to confine the free ends of the bag thereagainst, and lips projecting from one and the opposite end portions of the parallel members of the U and adapted to be reversely bent against the other member for the purpose described.

In testimony whereof I affix my signature in presence of two witnesses.

JAMES H. MACKALL.

Witnesses:
EDWARD R. PEARCE,
EDWARD J. BLACK.